United States Patent
Gribble et al.

(10) Patent No.: US 12,004,482 B2
(45) Date of Patent: Jun. 11, 2024

(54) FEEDBUNK SOAKING SYSTEM

(71) Applicants: Ted A. Gribble, Reno, TX (US); Donald L. Gribble, Reno, TX (US)

(72) Inventors: Ted A. Gribble, Reno, TX (US); Donald L. Gribble, Reno, TX (US)

(*) Notice: Subject to any disclaimer, the term of this patent is extended or adjusted under 35 U.S.C. 154(b) by 0 days.

(21) Appl. No.: 17/857,992

(22) Filed: Jul. 5, 2022

(65) Prior Publication Data

US 2022/0400653 A1    Dec. 22, 2022

Related U.S. Application Data

(63) Continuation of application No. 16/931,341, filed on Jul. 16, 2020, now Pat. No. 11,375,695.

(51) Int. Cl.
| | | |
|---|---|---|
| *A01K 13/00* | (2006.01) | |
| *A01K 1/00* | (2006.01) | |
| *A01K 1/10* | (2006.01) | |
| *A01K 15/04* | (2006.01) | |
| *A01K 29/00* | (2006.01) | |

(52) U.S. Cl.
CPC ......... *A01K 13/001* (2013.01); *A01K 1/0011* (2013.01); *A01K 1/10* (2013.01); *A01K 15/04* (2013.01); *A01K 29/005* (2013.01)

(58) Field of Classification Search
CPC .. A01K 13/003; A01K 1/0082; A01K 13/001; A01K 1/011; A01K 1/10
USPC .................... 119/673, 666, 60, 163, 421, 669
See application file for complete search history.

(56) References Cited

U.S. PATENT DOCUMENTS

| | | | |
|---|---|---|---|
| 3,032,011 A | 5/1962 | Stramel | |
| 3,870,023 A | 3/1975 | Wilson | |
| 3,884,192 A | 5/1975 | Knapp | |
| 3,941,096 A * | 3/1976 | Mann .................. | A01K 13/003 119/657 |
| 3,949,709 A * | 4/1976 | Myers ................. | A01K 13/003 119/667 |
| 4,165,715 A | 8/1979 | Knapp | |
| 4,476,809 A | 10/1984 | Bunger | |

(Continued)

FOREIGN PATENT DOCUMENTS

| | | |
|---|---|---|
| CN | 111406665 A | 7/2020 |
| EP | 2797409 B1 | 10/2015 |

OTHER PUBLICATIONS

U.S. Receiving Office of WIPO, International Search Report and Written Opinion regarding PCT Patent Application No. PCT/US2021/041748, dated Nov. 26, 2021, 20 pages.

(Continued)

*Primary Examiner* — Yvonne R Abbott-Lewis
(74) *Attorney, Agent, or Firm* — Kolisch Hartwell, P.C.

(57) ABSTRACT

A system may provide for delivering a sequence of one or more soaking sprays at a station where an animal is present. The station may include a pressurized pipe supplying a liquid for the soaking spray, a valve and nozzle coupled to the pipe, and a control circuit coupled to the valve. The control circuit may be operable to determine the sequence of the soaking spray using a signal from an animal sensor that is configured to detect the presence of the animal at the station. The system may include an environmental sensor providing at least one signal to the control circuit. The signal from the environmental sensor may be used by the control circuit to determine the sequence for the soaking spray.

20 Claims, 3 Drawing Sheets

(56) References Cited

U.S. PATENT DOCUMENTS

| | | | |
|---|---|---|---|
| 4,567,856 A | 2/1986 | Sorenson | |
| 4,580,529 A * | 4/1986 | Wilson | A01K 13/003 119/62 |
| 4,972,803 A * | 11/1990 | Stump | B60P 3/04 119/671 |
| 5,056,467 A * | 10/1991 | Schaefer | A01K 5/01 119/666 |
| 6,014,948 A * | 1/2000 | Gordon | A01K 1/00 119/449 |
| 6,230,660 B1 * | 5/2001 | Greeson | A01K 13/003 119/656 |
| 6,568,352 B2 * | 5/2003 | Fransen | A01K 1/12 119/14.08 |
| 6,578,828 B2 * | 6/2003 | Terrell | F24F 11/0001 119/436 |
| 6,615,769 B2 * | 9/2003 | Zhioua | A01K 13/003 119/657 |
| 6,675,739 B2 | 1/2004 | Terrell et al. | |
| 7,360,503 B2 | 4/2008 | Rapp | |
| 7,547,364 B2 * | 6/2009 | Polak | A01K 1/0082 239/289 |
| 8,210,129 B2 * | 7/2012 | Jones | A01K 13/003 119/666 |
| 8,397,677 B2 | 3/2013 | Bruer et al. | |
| 8,585,361 B1 * | 11/2013 | Terrell | A01K 1/0082 416/100 |
| 8,881,998 B1 | 11/2014 | Sinkfield et al. | |
| 9,339,009 B1 * | 5/2016 | Larson | A01K 13/003 |
| 2011/0186646 A1 * | 8/2011 | Tsuji | A01K 1/0082 239/3 |
| 2015/0223416 A1 | 8/2015 | Eng et al. | |
| 2016/0135428 A1 | 5/2016 | Nicholson | |
| 2020/0113153 A1 * | 4/2020 | Yoo | A01K 1/0076 |
| 2021/0161095 A1 * | 6/2021 | Perovic | A01K 1/0082 |

OTHER PUBLICATIONS

The International Bureau of WIPO, International Preliminary Report on Patentability regarding PCT Patent Application No. PCT/US2021/041748, dated Jan. 26, 2023, 10 pages.

* cited by examiner

FEEDBUNK SOAKING SYSTEM

CROSS-REFERENCE TO RELATED APPLICATION

This application is a continuation of U.S. patent application Ser. No. 16/931,341, filed Jul. 16, 2020, the entirety of which is hereby incorporated by reference for all

FIELD OF THE DISCLOSURE

This disclosure relates to systems and methods for cooling livestock to improve the animals' health and productivity. More specifically, the disclosed embodiments relate to improved methods for automatic control and delivery of soaking water, in systems which can sense and soak animals individually at a station and/or at each of a series of stations.

BACKGROUND OF THE DISCLOSURE

The present disclosure provides systems and methods for improving the condition of livestock animals individually, in particular the animal's comfort over a range of temperature and humidity and in different phases of the animal's feeding and reproductive cycles, while conserving cooling water and water run-off in an efficient manner. These systems and methods may have application for many types of livestock and in any environment, and the present disclosure primarily discusses their application to dairy cows in a temperate, warm, or hot climate.

Dairy cows typically prefer, and are most productive in, a cool climate, e.g., about 40-45° F. with moderate humidity. However, dairy farms also operate in climates that are constantly, or that have at least considerable periods, above such temperatures, which may also be combined with high humidity. Dairy cows in warmer and more humid climates may be stressed and such stress generally increases the more temperature and humidity increase. Dairy cows in these conditions can benefit from water periodically applied by an overhead spray to the cows' back, neck, and head, which cools the cows, reducing the cows' distress. The cows' improved comfort in turn increases milk production, both directly and due to increased appetite and feed consumption, and also can improve reproductive rates.

Existing systems for soaking dairy cows with water typically provide a pipe routed above the cows along a feed line with nozzles positioned at each feed station to soak the cows' backs. The controls for the pipe typically include only a single valve for turning on all the nozzles so water is delayed in spraying out the nozzles while the pipe pressurizes. Such systems may provide for control over the timing and length of the on cycles, such alternately turned on from 1 to 3 minutes, then off for 5 to 15 minutes, but lack individual-stall controls.

Dairy cows do not dissipate heat from their bodies effectively by sweating, so water applied over a large portion of the cows' bodies has been shown to be effective in improving heat dissipation, both from the heat sink of water applied at a lower temperature than the cows' body temperature and by evaporative cooling. Preferably, this cooling is timed to precede and/or coincide with the cows' eating, because they eat more when cooler, but existing systems do not necessarily provide such timing.

Dairy cows generally feed several times a day (e.g., 10-12 times) and they choose for themselves the timing and optimally feed for about 30-minutes at a time. The system that cycles on for 1 to 3 minutes and then off for 5 to 15 minutes, in a generally fixed pattern and for the full length of one or more feedlines, will, for some cows, turn on later than optimal and not provide enough water, depending on the individual cows' self-determined arrival and feeding times. This also means that at some feed stations, the system will spray water not onto a cow that would carry it around while it evaporates, but will instead go directly into the waste water run-off system. This is inefficient in terms of the amount of water used, the amount of waste water produced, and the failure to cool some cows. Additionally, the water spraying where no animal is present is more likely to drift onto the feed, which can lead to spoilage. Some farmers, to avoid this overuse and waste, will operate the cooling system for a smaller portion of the day, to the detriment of their cows' comfort and productivity.

Examples of systems for spraying water on livestock are disclosed in U.S. Patent/Publication Nos. 20160135428, U.S. Pat. Nos. 3,032,011, 3,884,192, 4,165,715, 4,476,809, 4,567,856, 4,580,529, 6,568,352, 6,578,828, 6,675,739, 7,360,503, 8,397,677, 8,881,998, and 9,339,009. The disclosures of these and all other publications referenced herein are incorporated by reference in their entirety for all purposes.

Some of these references describe attempts to control a spray at individual feed stalls, such as U.S. Pat. Nos. 3,032,011 and 3,884,192 but these fail to provide an effectively timed cooling-water spray in a manner that would improve the cow's stress level and feed consumption. The U.S. Pat. No. 3,032,011 disclosure describes applying insecticide to a cow "in response to lowering of the cow's head for feeding, or licking salt, from a feedbox or manger" as detected by a mechanical switch pushed by the cow's head. Insecticide generally does not cool the cow and may have a negative effect on feeding. Additionally, using the cow's lowering her head to feed would provide disadvantageous timing of a cooling spray because the application of the cooling spray is what encourages the cow to eat. The mechanical switch is also subject to wear and fouling from direct contact with the cow.

The disclosure of U.S. Pat. No. 3,884,192 recognizes the problems with automatic sprayer devices being "so constructed that in their operation they frighten cattle due to excessive moving of components," and "that cattle cannot step very high, or at least are reluctant to do so," but nonetheless require the cow to step up onto a platform that depresses beneath the cow's weight. Such a system, including its mechanical switch being located on the barn floor where it is susceptible to the water and waste present there, is impractical for actual, regular use.

The system of the present disclosure provides for a feed stall and/or for a rest station that, for the cow, is indistinguishable from existing feed stalls and rest stations, and that provides a reliable, non-intimidating, non-startling application of a cooling spray that may be optimized for the cow in several ways. The optimization may include setting operation variables for the whole system and for individual cow stations, such as turn-on time, lengths and numbers of spraying period(s) and off-interval(s), and maximum spraying per cow presence, and may take into account environmental variables including temperature, humidity, milking periods, veterinary inspection periods, wind speed, and the cows' gestational cycles.

SUMMARY OF THE DISCLOSURE

The structure according to the present disclosure may provide a system capable of delivering a sequence of one or more soaking sprays at a station only when an animal is present at the station. The station may be provided with a pressurized pipe supplying a liquid for the soaking spray. The system may include a valve configured to be coupled to the pipe and operable for controlling delivery of the soaking spray. The system may further include a nozzle coupled to the valve. The nozzle may be configured to deliver the soaking spray of the liquid from the pipe to the animal. The system may further include a control circuit coupled to the valve. The control circuit may be operable to determine the sequence of the soaking spray. The system may further include an animal sensor coupled to the control circuit and configured to detect the presence of the animal at the station. The system may further include an environmental sensor providing at least one signal to the control circuit, wherein the soaking spray may be delivered to the animal at the station in the determined sequence. The sequence for the soaking spray may be determined at least in part by the signal or signals from the environmental sensor.

The station in the system may further include a first headlock hole for use by a first animal and a second headlock hole for use by a second animal. The nozzle may be configured to provide the soaking spray to the first animal and to the second animal.

The system may further provide for the control circuit determining that the sequence includes an initial turn-on of the soaking spray within about 15 seconds of the animal sensor detecting the presence of the animal at the station. The system may further provide for the control circuit determining that the sequence includes an initial on-cycle of the soaking spray, after the animal sensor detects the presence of the first animal at the station, wherein the initial on-cycle is between about one-half minute and about three minutes. Alternatively, the system may provide for the control circuit determining that the sequence includes an initial on-cycle of the soaking spray, after the animal sensor detects the presence of the first animal at the station, wherein the initial on-cycle is between about one minute and about three minutes.

The system may further provide for the control circuit determining that the sequence includes, after the animal sensor detects the presence of the first animal at the station and after an initial on-cycle of the soaking spray, an off-cycle of between about three minutes and about fifteen minutes. Alternatively, the system may provide for the control circuit determining that the sequence includes, after the animal sensor detects the presence of the first animal at the station and after an initial on-cycle of the soaking spray, an off-cycle of between about five minutes and about fifteen minutes.

The system may further provide for the control circuit determining that the sequence includes, while the animal sensor detects the presence of the animal at the station, multiple on-cycles and off-cycles. The system may further provide for the control circuit determining that the sequence includes an extended off-cycle after a predetermined number of on-cycles while the animal sensor detects the presence of the animal at the station.

The system may further provide for the environmental sensor to be configured to measure at least one of a temperature and a humidity and to provide the selected one of the temperature and the humidity in the at least one signal to the control circuit. Additionally, the system may further provide for the environmental sensor to be configured to measure both a temperature and a humidity and to provide two signals to the control circuit indicating the temperature and the humidity. The system may further provide for the control circuit determining that the sequence includes no soaking spray when the at least one signal from the environmental sensor is outside a predetermined range.

The system may further provide for the environmental sensor to measure a temperature in a vicinity of the station and further provide for the control circuit to determine the sequence to include an on-cycle for the soaking spray that increases with the temperature. The system may further provide for the environmental sensor to measure a temperature in a vicinity of the station and further provide for the control circuit to determine the sequence to include an off-cycle for the soaking spray that decreases with the temperature.

The system may further provide for the environmental sensor to measure a humidity in a vicinity of the station and for the control circuit to determine the sequence to include an off-cycle for the soaking spray that increases with the humidity when the humidity is in a moderate range. The system may further provide for the environmental sensor to measure a humidity in a vicinity of the station and for the control circuit to determine the sequence to include an off-cycle for the soaking spray that decreases with the humidity when the humidity is in a high range. The system may further provide for the environmental sensor to measure a humidity in a vicinity of the station and for the control circuit to determine the sequence to include an on-cycle for the soaking spray that increases with the humidity when the humidity is in a high range.

The station in the system may further provide for the station being a feeding station including a headlock unit, and the system may include a bracket configured to couple the nozzle to the headlock unit. Alternatively, the nozzle may be coupled to an existing building column or to another column, post, railing, etc., that may be added for purposes that include mounting the nozzle. The system may further provide for the station including a floor, with the animal sensor positioned above the floor. The system may further provide for the animal sensor including an ultrasonic sensing capability and/or an animal RFID tag sensing capability and/or a mechanical sensing capability.

A network of controlled piping may be coupled to a plurality of stations and configured for selectively delivering a soaking spray at each station. The network may be configured for operating under control of one or more signals developed adjacent the stations to deliver the soaking spray to one or more animals.

The network may include a plurality of nozzles, with at least one nozzle at each station. Each nozzle may be configured to be coupled to the pipe and to deliver the soaking spray from the pipe to the animal. The network may further include a plurality of valves, and each valve may be operably coupled to the piping and to at least one nozzle. Each valve may be configured for controlling delivery of the soaking spray at one of the stations.

The network may further include a control circuit coupled to the plurality of valves. The network may further include a plurality of animal sensors coupled to the control circuit, with at least one sensor at each station. Each animal sensor may be configured to detect the presence of one of the animals at the station. The network may further include at least one environmental sensor providing at least one signal to the control circuit. The environmental sensor may be configured to be positioned in the vicinity of at least one of the stations. The network may be configured to provide for the soaking spray to be delivered to the animal at the station in a sequence determined at least in part by the at least one signal from the environmental sensor.

The network may further provide for the control circuit to be operable to lock, in an off condition, a first portion of the plurality of valves while allowing a second portion of the plurality of valves to deliver the soaking spray in accordance with the animal sensors and environmental sensors of the second portion of the plurality of valves. The network may further include an information-gathering unit coupled to the control circuit, the transmitting unit operable to gather a set of information about delivery of the soaking spray at the stations and animal herd behavior at the stations for sending to a remote processing unit. The system may also be paired with, and gather information from, individual animal radio-frequency identification (RFID) units or systems to track individual animal behavior, as well as herd behavior, at the stations.

Features, functions, and advantages may be achieved independently in various embodiments of the present disclosure, or may be combined in yet other embodiments, further details of which can be seen with reference to the following description and drawings. Advantages of the present disclosure will be more readily understood after considering the drawings and the Detailed Description.

DETAILED DESCRIPTION OF THE DISCLOSURE

Figures 1, 3:
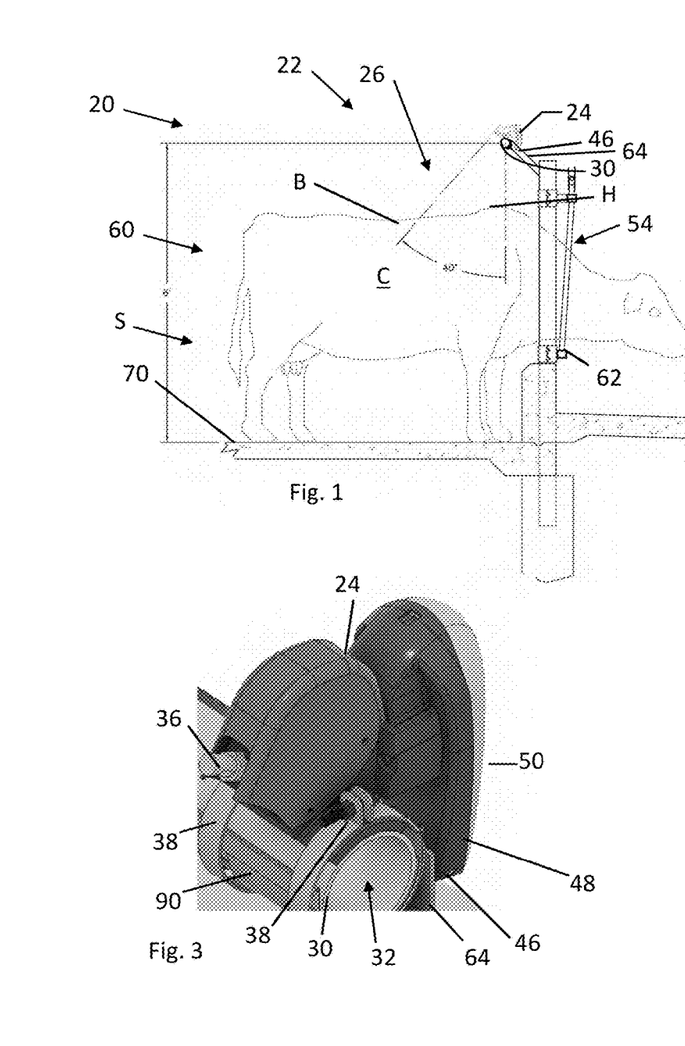
FIG. 1 is a side view of a station in a system according to the present disclosure, including a pipe and a cooling unit coupled to the pipe, a valve coupled to the pipe, a nozzle coupled to the valve, a control circuit coupled to the valve and to an animal sensor, and a cow present with its head through a headlock to reach the feed at a feedline.
FIG. 3 is a pictorial view of a pipe with an alternative embodiment for a cooling unit coupled to the pipe, a valve coupled to the pipe, a nozzle coupled to the valve, and a control circuit coupled to the valve and to an animal sensor.

As seen in FIG. 1, a system 20 may include multiple stations, such as a station 22 configured to provide a space S where an animal, such as a cow C, may be present, e.g., in a standing condition. The system may include a cooling unit 24 positioned to providing a soaking spray 26 to the animal, e.g. to the back B of cow C. A piping network 28 may include at each station a pipe 30, which may be pressurized to supply a liquid 32, such as water, for soaking spray 26.

System 20 may include, e.g., at each station 22, a valve 34 configured to be coupled to pipe 30. Valve 34 may be operable for controlling delivery of soaking spray 26. Station 22 may include a nozzle 36 coupled to valve 34, typically through a channel that includes a filter 88. Filter 88 and cooling unit 24 preferably are configured such that the filter may be removed and cleaned and/or replaced. Nozzle 36 may be configured to deliver soaking spray 26 of liquid 32 from pipe 30 to the animal. For example, nozzle 36 may be constructed to provide spray 26 over an arc of about 40° to cover the animal's back with liquid 32. The nozzle structure may be selected to provide a shape and a width of the arc as best suited for a particular application and/or for a particular animal type.

Figure 2:
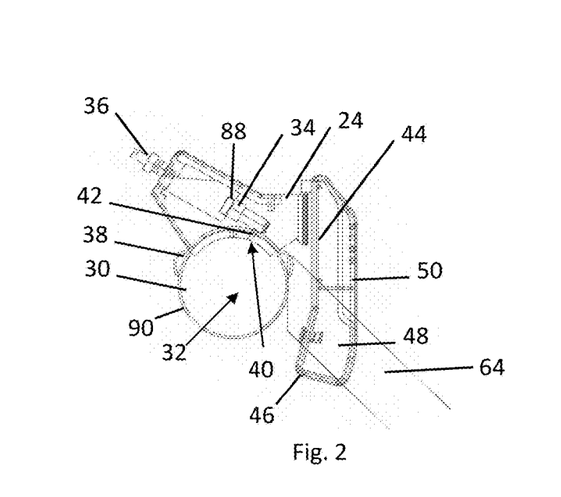
FIG. 2 is a side cross-sectional view of the pipe and cooling unit of FIG. 1.
Figure 4:
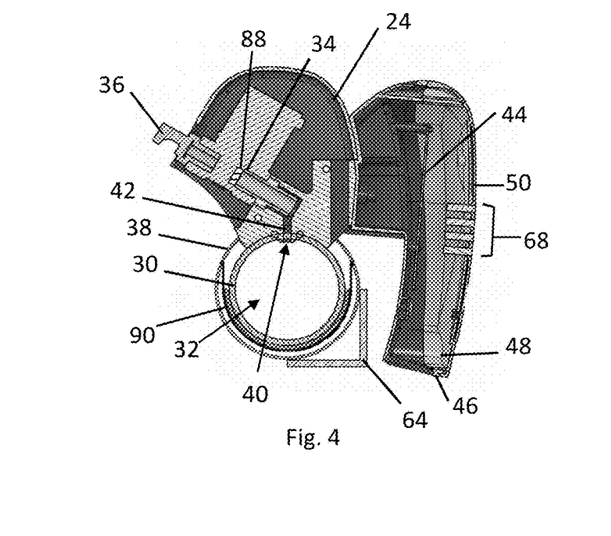
FIG. 4 is a side cross-sectional view of the pipe and cooling unit of FIG. 3.

For example, as best seen in FIGS. 2-4, cooling unit 24 may be affixed to pipe 30. Pipe 30 may be in a support tray 90 and cooling unit 24 may be held in place by one or more clamps 38, or any other suitable means for maintaining cooling unit 24 in place during repeated sequences of spraying. Pipe 30 may be coupled to valve 34 through an opening 40 in pipe 30, for example by a watertight connection through a tube 42 to valve 34, which allows the liquid to pass from pipe 30 to valve 34. Opening 40 may be at any suitable location on pipe 30, e.g., at the top of pipe 30 as in FIG. 4 or offset from the top as in FIG. 2.

System 20 may include, e.g., as part of cooling unit 24, a control circuit 44 coupled to valve 34. Control circuit 44 may be operable to determine a sequence of the soaking spray.

System 20 may include an animal sensor, e.g., ultrasonic sensor 46, coupled to control circuit 44 and configured to detect the presence of the animal at the station. Alternatively or additionally, the animal sensor may include an RFID tag sensor for detecting the animal's presence and/or identifying the particular animal at the station. Animal sensor 46 may be located at a lower portion 48 of a housing 50 for control circuit 44. The animal sensor may include, e.g., as a backup to an ultrasonic and/or RFID sensor, a mechanical switch 66 (see FIG. 8) to detect the animal's presence. The mechanical switch may be of any suitable type, e.g., a paddle switch that detects the animal's placing its head through a feeding headlock, or a treadle switch or pressure sensor on the floor of the feeding station.

Figure 5:
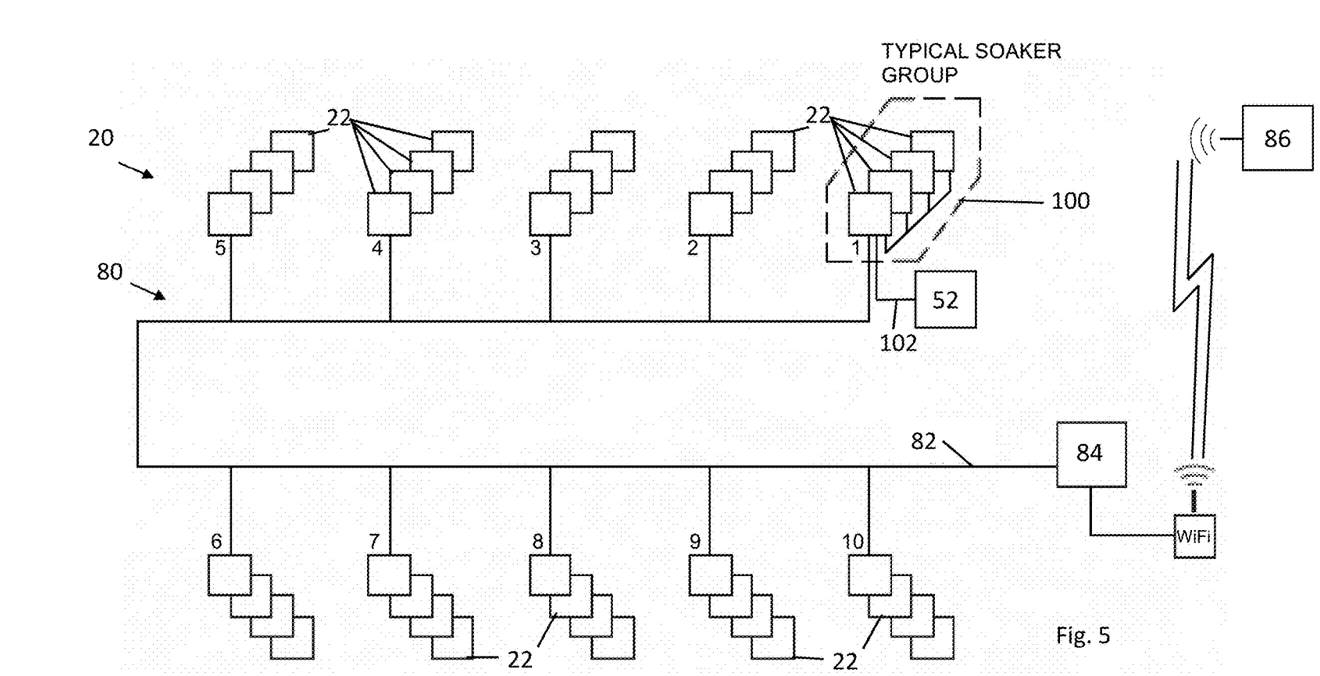
FIG. 5 is a block diagram of a network of cooling stations arranged in soaker groups with control circuits connected to an information gathering unit, which is in turn connected to a remote processing unit.
Figure 6:
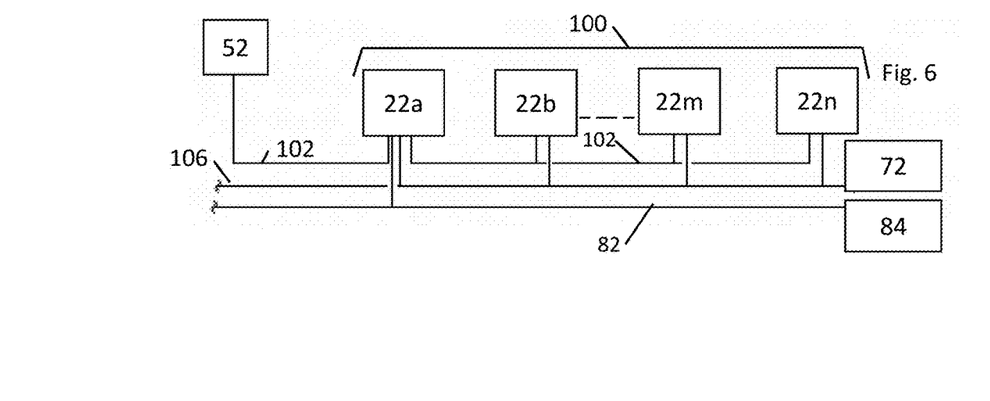
FIG. 6 is a block diagram of a soaker group.

As shown in FIGS. 5 and 6, system 20 may include multiple stations 22. Multiple stations 22 may be grouped together, such as group 100 of stations 22a through 22n. In the example of FIG. 5, there are four stations but in practice any number may be in each group. System 20 may include multiple groups of stations, e.g., the ten groups shown in FIG. 5, and typically at least as many as 16 groups. System 20 may further include an environmental sensor 52 providing one or more signals 102 to the control circuit 44 in one or more of stations 22. For example, a first sensor 52 may provide signal(s) 102 to a first station 22 in one group of stations. The first station 22 may then provide signal(s) 102 to the other stations in the group on a communication line 104. In FIG. 5, this is illustrated for one of the groups and it will be understood that environmental sensors and communications may be provided for all of the groups.

Multiple environmental sensors may be used in the system, particularly where the soaker stations are spread out in different areas with different environments, e.g., inside a barn and outside or the barn, or, in different areas of the barn with different environments, such as the south side of the barn and the north side of the barn. Environmental sensors typically provide information about temperature and relative humidity and any other useful measures of the environment, such as wind speed, UV radiation levels, and air pressure.

System 20, through operation of control circuit 44, pipe 30, valve 34, and nozzle 36 may deliver soaking spray 26 to the animal at the station in a pre-determined sequence of one or more intervals of soaking spray and to deliver the soaking spray only when an animal is present at the station. Animal sensor 46 may provide the signal to the control circuit so that the control circuit may deliver the soaking spray only during an animal's presence. The animal's presence may be determined by the control circuit based on the signal from the animal sensor. For example, the control circuit may be operational to track a series of indications from the animal sensor and determine that an animal is present when the animal sensor signal remains positive for at least about 10-20 seconds.

Figure 7A:
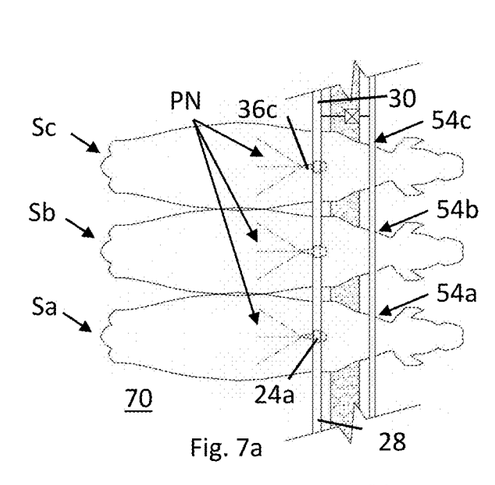
FIG. 7a is an overhead view of three stations in the system, each station having a cooling unit with a nozzle providing a spray pattern configured to soak the back of one animal.

As shown in FIG. 7a, station 22 in system 20 may include a first headlock hole 54a for use by a first animal, a second headlock hole 54b for use by a second animal, and a third headlock hole 54c for use by a third animal. Each of nozzles 36a-c may be configured to provide the soaking spray to the animal in its station. Each of nozzles 36a-c provides a spray in a narrow pattern PN directed at just one animal. In the embodiment shown in FIG. 7a, nozzle 36 provides a wide spray pattern PW, which in this case is wide enough to wet the back of the cow directly below it and at least part (e.g., roughly one-half) of the animals' backs on either side of it. In this configuration, one-half the number of cooling units are required to provide spray patterns covering all of the cows along a feedline.

Control circuit 44 may be provided with suitable logic for determining the sequence, such as a microprocessor or a programmable logic array, programmed to receive inputs from the animal and environmental sensors and to control the valve to provide the sequence of spraying. As one example, system 20 may provide for control circuit 44 determining that the sequence includes an initial turn-on of the soaking spray within about 15 seconds of animal sensor 46 detecting the presence of the animal at station 22.

As another example, system 20 may provide for control circuit 44 determining that the sequence includes an initial on-cycle of the soaking spray, after animal sensor 46 detects the presence of the first animal at the station. The initial on-cycle may be any duration suitable to produce the desired cooling for the environmental conditions. For example, the initial on-cycle may be between about one-half minute and about three minutes. Alternatively, the initial on-cycle may be between about one minute and about three minutes.

Additionally, system 20 may provide for control circuit 44 determining that the sequence includes an initial off-cycle after the animal sensor detects the presence of the first animal at the station and after an initial on-cycle of the soaking spray. The initial off-cycle may be of any duration suitable to produce the desired cooling for the environmental conditions. As one example, the off-cycle may be between about three minutes and about fifteen minutes. Alternatively, the off-cycle may be between about five minutes and about fifteen minutes. Other durations for the initial on-cycle and off-cycle may be used as best suited to conditions and desired outcome.

System 20 may provide for control circuit 44 determining that the sequence includes, while the animal sensor detects the presence of the animal at the station, multiple on-cycles and off-cycles. These on-cycles and off-cycles may be of the same or different durations as the initial on-cycle and off-cycle as best suited to the particular situation. System 20 may provide for control circuit 44 determining that the sequence includes an extended off-cycle after a predetermined number of on-cycles while the animal sensor detects the presence of the animal at the station.

Figure 8:
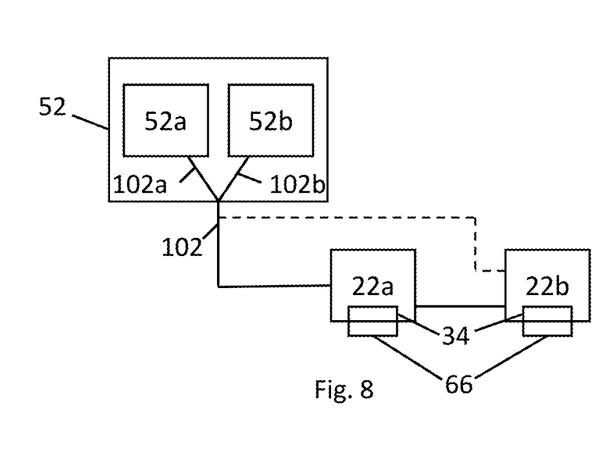
FIG. 8 is a block diagram of environmental sensors coupled over a communications line to a group of soaker units.

As noted above, one or more environmental sensors 52 may be used, and these are typically placed in the vicinity of one or more stations 22. E.g., as shown in FIG. 8, environmental sensor 52a may be configured to measure an ambient temperature and environmental sensor 52b may be configured to measure a humidity. Sensors 52a, 52b may be combined in a single unit or be separate devices. One or both of these sensors may provide a signal 102 to control circuit 44 in at least one station 22. Signal 102 may be directly communicated to multiple stations, as shown in dashed lines in FIG. 8, or to one station that transmits the signal to other stations, as shown in solid lines in FIG. 8. For example, sensor 52 may be a unit that measures both temperature and relative humidity and then uses RS-485 connections and protocol to transmit the signal to control circuit 44, which may also be capable of RS-485 communication with the control circuit in other stations.

System 20 may provide for control circuit 44 to determine that the sequence includes no soaking spray for certain environmental conditions, e.g., when either or both of the temperature and humidity signals from the environmental sensor is/are outside a predetermined range. E.g., if the ambient temperature is already below the upper end of a range considered optimal for the cows, then no cooling spray will be provided.

System 20 may provide for control circuit 44 to determine the sequence to include an on-cycle for the soaking spray that increases with the temperature. To provide the on-cycle to increase with temperature, the control circuit may use the ambient temperature received from the environmental sensor and determine a suitable on-cycle from a table lookup, from a linear calculation, or by any other suitable algorithm. System 20 may provide for control circuit 44 to determine the sequence to include an off-cycle for the soaking spray that decreases with the temperature. Similar to the on-cycle calculation, the control circuit may use the ambient temperature to determine the off-cycle by any suitable algorithm.

System 20 may provide for control circuit 44 to determine the sequence to include an off-cycle for the soaking spray that increases with the humidity when the humidity is in a moderate range. System 20 may provide for control circuit 44 to determine the sequence to include an off-cycle for the soaking spray that decreases with the humidity when the humidity is in a high range. To provide the off-cycle to increase with humidity, the control circuit may use the ambient humidity received from the environmental sensor and determine a suitable off-cycle from a table lookup, from a linear calculation, or by any other suitable algorithm. System 20 may provide for control circuit 44 to determine the sequence to include an on-cycle for the soaking spray that increases with the humidity when the humidity is in a high range. Similar to the off-cycle calculation, the control circuit may use the ambient humidity to determine the off-cycle by any suitable algorithm.

Generally speaking, the control circuit may use temperature and/or humidity to calculate on-cycles and off-cycles to optimize the effective cooling of the sequences of soaking sprays. In the absence of environmental sensors, or if the environmental sensors are not working and/or not transmitting a signal to the control circuit, the control circuit may be programmed with default temperature and/or humidity values to use in determining the spraying sequence.

As shown in FIG. 1, station 22 may be a feeding station 60 including a headlock unit 62, and the system may include a support, such as brace 64 providing a fixed mount for cooling unit 24. Brace 64 may be configured to be coupled to headlock unit 62 or to an existing building column or to another column, post, railing, etc., that may be added to the barn.

Control circuit 44 may include a set of status LEDs 68, which may be visible externally to housing 50 (see FIG. 4). As an example, status LEDs 68 may include an operational-status indicator, such as a green LED that flashes to indicate the system is powered and ready for operation to provide one or more sequences of soaking spray. Another LED may indicate communication, e.g., lighting up red to indicate data sent and green indicate data received.

Another LED may indicate the status of the animal sensor, e.g., the ultrasonic sensor. This LED may light up amber to indicate the sensor has detected an object in its field of view.

The control circuit may be operational to determine whether an animal is remaining in the station, typically based on a series of indications from the animal sensor. When the control circuit determines that an animal is present and likely to remain present for a feeding or cooling session, then it may initiate a sequence and light another LED to so indicate. For example, a "cow presence" LED may provide a steady blue light to indicate that the algorithm operable in the control circuit has determined that a cow is present. The control circuit may also take into account whether the temperature is within an acceptable range and whether the solenoid/valve has been activated to spray the animal. A flashing blue light may be provided to indicate the unit has completed the spray portion of the spray cycle and the cow is still present and the unit is prepared to enter the second and subsequent active spray period.

In a spraying sequence during an animal's remaining in the station, the on-cycles and off-cycles may remain constant in duration, or may increase/decrease during the sequence. As an example of constant durations, the initial on-cycle may be 2 minutes and the initial off-cycle 13 minutes, with these on-cycles and off-cycles repeating as long as the animal remains in the station. As an example of variable cycles during a sequence, the ratio of the on-cycle to the off-cycle may increase during the sequence. For example, the on-cycle may start at 13% of the combined cycles, i.e., 2 minutes out of 15 minutes, as described above. Then the next on-cycle may be 25% of the combined cycle, then 40%, and then 65%.

Typically, the system will treat an animal who enters the station and starts a cooling session and then leaves and re-enters the station, as a new animal. In this case the system re-starts the spraying sequence at the beginning. If an animal is detected as remaining in a station longer than a set duration, e.g., for more than four on-off cycles, the control circuit may interrupt the sequence. The interruption may be for a set period or until the animal is detected as leaving the station, and then a spraying sequence may start on an animal's entering the station.

Station 22 may include a floor 70, with animal sensor 46 positioned above floor 70. Stations 22 may get power for operation from a power source 72, such as a 24 VAC line 106.

As shown in FIG. 5, network 80 that controls piping 28 may be coupled to a plurality of stations 22 and configured for selectively delivering a soaking spray at each station. Network 80 may be configured for operating under control of one or more signals developed adjacent stations 22 to deliver the soaking spray to one or more animals. Each station 22 may be configured as described above or one or more may be differently configured for additional purposes, e.g., as a cooling rest station without being used for feeding.

Figure 7B:
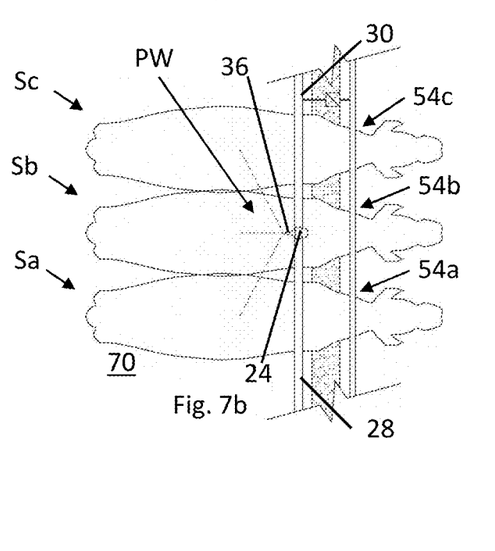
FIG. 7b is an overhead view of three stations in an alternative embodiment of the system, where a cooling unit centered on one station has a nozzle providing a spray pattern configured to soak the back of the animal at a central station as well as at least a portion of the animal at each station to the left and to the right of the central station.

Network 80 may include a plurality of nozzles 36, with at least one nozzle at each station 22. Alternatively, nozzles 36 may provide a spray to cover more than one station, as shown in FIG. 7b. Each nozzle 36 may be configured to be coupled to pipe 30 and to deliver the soaking spray from pipe 30 to the animal. Network 80 may further include a plurality of valves 34, and each valve may be operably coupled to the piping and to at least one nozzle. Each valve 34 may be configured for controlling delivery of the soaking spray at one of the stations.

Network 80 may further include one or more control circuits 44 coupled to the plurality of valves. Network 80 may further include a plurality of animal sensors 52 coupled to control circuit 44, typically with at least one animal sensor 52 at each station 22. Each animal sensor may be configured to detect the presence of one of the animals at the station and to signal the presence to control circuit 44. Network 80 may include at least one environmental sensor 52 providing at least one signal to control circuit 44. Environmental sensor 52 may be configured to be positioned in the vicinity of at least one of the stations. Network 80 may be configured to provide for the soaking spray to be delivered to the animal at the station in a sequence determined at least in part by the at least one signal from the environmental sensor.

Network 80 may further provide for control circuit 44 to be operable to lock, in an off condition, a first portion of the plurality of valves while allowing a second portion of the plurality of valves to deliver the soaking spray in accordance with the animal sensors and environmental sensors of the second portion of the plurality of valves.

Network 80 may further include an information-gathering/controlling unit 84 coupled to control circuit 44 in station 22. For example, a communication line 82 may be coupled between the control circuit of at least one station in each group of stations, as shown in FIGS. 5 and 6. Information-gathering unit 84 may be operable to gather a set of information about delivery of the soaking spray at the stations for sending to a remote processing unit 86. As described above, control circuit 44 determines the spraying patters, and this may be augmented or replaced by control in the information-gathering/controlling unit.

The information gathered by unit 84, which may be passed on to remote processing unit 86 for presentation to a farmer, may include information about animal behavior at the feeding station. This information may include the lengths of time the animals remain at the stations, as well as reports on how many are staying long enough, and/or too long.

The information may also include the amount of water used in spraying sequences, which in turn may be used in calculating and reporting how much water is saved compared to a previous system. Reducing water reduces the cost of spraying as well as reducing the amount of overspray reaching the feed. The information may also include records of which headlocks are used and not used and may alert the farmer to an animal remaining to long, which may indicate a problem such as the animal being stuck. If the animals are carrying RFID tags, e.g., on a collar or ear tag, or embedded, the information may be specified for that animal. If the animals are not uniquely identified at the station, the information may also be used for analyzing herd behavior.

It is believed that the disclosure set forth herein encompasses multiple distinct inventions with independent utility.

While each of these inventions has been disclosed in its preferred form, the specific embodiments thereof as disclosed and illustrated herein are not to be considered in a limiting sense as numerous variations are possible. To the extent that section headings are used within this disclosure, such headings are for organizational purposes only, and do not constitute a characterization of any claimed invention. Each example defines an embodiment disclosed in the foregoing disclosure, but any one example does not necessarily encompass all features or combinations that may be eventually claimed. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A system for delivering a sequence of one or more soaking sprays at a station only when a first animal is present at the station and only when an ambient temperature at the station is above an upper end of a predetermined range, and wherein the station is provided with a pressurized pipe supplying a liquid for the soaking spray, the system comprising:
   a. a valve configured to be coupled to the pipe and operable for controlling delivery of the soaking spray;
   b. a nozzle coupled to the valve, the nozzle configured to deliver the soaking spray of the liquid from the pipe to the animal;
   c. a control circuit coupled to the valve, the control circuit operable to determine the sequence of the soaking spray;
   d. an ultrasonic animal sensor coupled to the control circuit and configured to detect the presence of the first animal at the station; and
   e. a temperature sensor providing a signal to the control circuit, the signal representing the ambient temperature at the station, wherein the control circuit determines the sequence to include no soaking spray unless the ambient temperature is above the upper end of the predetermined range, and, if so, the soaking spray is delivered to the animal at the station in the sequence.

2. The system of claim 1 for use with the station, wherein the station includes a first headlock hole for use by the first animal and a second headlock hole for use by a second animal, wherein the nozzle is configured to provide the soaking spray to the first animal and to the second animal.

3. The system of claim 1 wherein the control circuit is operable to determine the sequence to include an initial turn-on of the soaking spray within about 15 seconds of the animal sensor detecting the presence of the first animal at the station.

4. The system of claim 1 wherein the control circuit is operable to determine the sequence to include an initial on-cycle of the soaking spray, after the animal sensor detects the presence of the first animal at the station, wherein the initial on-cycle is between about one-half minute and about three minutes.

5. The system of claim 1 wherein the control circuit is operable to determine the sequence to include an initial on-cycle of the soaking spray, after the animal sensor detects the presence of the first animal at the station, wherein the initial on-cycle is between about one minute and about three minutes.

6. The system of claim 1 wherein the control circuit is operable to determine the sequence to include, after the animal sensor detects the presence of the first animal at the station and after an initial on-cycle of the soaking spray, an off-cycle of between about three minutes and about fifteen minutes.

7. The system of claim 1 wherein the control circuit is operable to determine the sequence to include, after the animal sensor detects the presence of the first animal at the station and after an initial on-cycle of the soaking spray, an off-cycle of between about five minutes and about fifteen minutes.

8. The system of claim 1 wherein the control circuit is operable to determine the sequence to include, while the animal sensor detects the presence of the first animal at the station, a plurality of on-cycles and off-cycles.

9. The system of claim 8 wherein the control system is operable to determine the sequence to include an extended off-cycle after a predetermined number of on-cycles while the animal sensor detects the presence of the first animal at the station.

10. The system of claim 1 wherein the control circuit determines the sequence to include an on-cycle for the soaking spray that increases with the temperature.

11. The system of claim 1 wherein the control circuit determines the sequence to include an off-cycle for the soaking spray that decreases with the temperature.

12. The system of claim 1 further comprising a humidity sensor configured to measure a humidity at the station, and to provide the humidity to the control circuit.

13. The system of claim 12 wherein the control circuit determines the sequence to include an off-cycle for the soaking spray that increases with the humidity when the humidity is in a moderate range.

14. The system of claim 12 wherein the control circuit determines the sequence to include an off-cycle for the soaking spray that decreases with the humidity when the humidity is in a high range.

15. The system of claim 12 wherein the control circuit determines the sequence to include an on-cycle for the soaking spray that increases with the humidity when the humidity is in a high range.

16. The system of claim 1 for use with the station, wherein the station is a feeding station including a headlock unit, wherein the system further comprises a bracket configured to couple the nozzle to the headlock unit.

17. The system of claim 1 further comprising a mechanical switch coupled to the valve and operable to detect the presence of the first animal at the station.

18. A network of controlled piping coupled to a plurality of stations, the network configured for selectively delivering a soaking spray at each station only when an ambient temperature at the station is above an upper end of a predetermined range, the network configured for operating under control of one or more signals developed adjacent the stations to deliver the soaking spray to one or more animals, the network comprising:

a. a plurality of nozzles, at least one nozzle at each station, each nozzle configured to be coupled to the pipe and to deliver the soaking spray from the pipe to the animal;
b. a plurality of valves, each valve operably coupled to the piping and to at least one nozzle, each valve configured for controlling delivery of the soaking spray at one of the stations;
c. a control circuit coupled to the plurality of valves;
d. a plurality of ultrasonic animal sensors coupled to the control circuit, at least one sensor at each station, each ultrasonic animal sensor configured to detect the presence of one of the animals at the station; and
e. at least one temperature sensor providing at least one signal to the control circuit, the temperature sensor configured to be positioned in the vicinity of at least one of the stations, the at least one signal representing the ambient temperature in the vicinity of at least one of the stations, wherein the control circuit determines the sequence to include no soaking spray unless the ambient temperature is above the upper end of the predetermined range, and, if so, wherein the soaking spray is delivered to the animal at the station in a sequence determined at least in part by the at least one signal from the temperature sensor.

19. The network of claim 18 wherein the control circuit is operable to lock in an off condition a first portion of the plurality of valves while allowing a second portion of the plurality of valves to deliver the soaking spray in accordance with the ultrasonic animal sensors and at least one temperature sensor of the second portion of the plurality of valves.

20. The network of claim 18 further comprising an information-gathering unit coupled to the control circuit, the transmitting unit operable to gather a set of information about delivery of the soaking spray at the stations for sending to a remote processing unit.

* * * * *